(12) United States Patent
Luther et al.

(10) Patent No.: US 8,826,146 B2
(45) Date of Patent: Sep. 2, 2014

(54) UNIFORM USER INTERFACE FOR SOFTWARE APPLICATIONS

(75) Inventors: Paul S. Luther, Round Rock, TX (US); Robert Bruce Mahaffey, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 1506 days.

(21) Appl. No.: 10/965,624

(22) Filed: Oct. 14, 2004

(65) Prior Publication Data

US 2006/0085748 A1    Apr. 20, 2006

(51) Int. Cl.
*G06F 3/0481*    (2013.01)

(52) U.S. Cl.
USPC .......... 715/747; 715/735; 715/763; 715/765; 715/789

(58) Field of Classification Search
CPC . G06F 3/0481; G06F 3/04886; G06F 9/4443; G06F 3/038; G06F 9/542
USPC ......... 715/714, 771, 717, 742, 248, 746, 744, 715/747, 735, 763, 765, 789
See application file for complete search history.

(56) References Cited

U.S. PATENT DOCUMENTS

| | | | |
|---|---|---|---|
| 6,417,869 B1 * | 7/2002 | Do | 715/718 |
| 6,775,598 B2 * | 8/2004 | Bergmann et al. | 701/1 |
| 6,976,217 B1 * | 12/2005 | Vertaschitsch et al. | 715/717 |
| 7,136,909 B2 * | 11/2006 | Balasuriya | 709/220 |
| 2001/0047263 A1 * | 11/2001 | Smith et al. | 704/275 |
| 2002/0152255 A1 * | 10/2002 | Smith et al. | 709/102 |
| 2003/0013492 A1 * | 1/2003 | Bokhari et al. | 455/566 |
| 2003/0126330 A1 * | 7/2003 | Balasuriya | 710/107 |
| 2004/0030460 A1 | 2/2004 | Bergmann et al. | |
| 2005/0229103 A1 * | 10/2005 | King | 715/741 |

FOREIGN PATENT DOCUMENTS

TW    569122 B    1/2004
TW    583576 B    4/2004

OTHER PUBLICATIONS

Diaz, L. et al: "Web Services for Remote Portals (WSRP)" IBM Developerworks, Jan. 21, 2002, XP002274610.
Microsoft Corp.: "How to Use Speech Recognition in Windows XP" Microsoft Knowledge Base Article KB306901, 'Online! Jul. 15, 2004, XP002356347.
Will, R. et al: "WebSphere Portal: Unified User Access to Content, Applications and Services" Websphere Application Server, 'Online! vol. 43 No. 2, Apr. 26, 2004, XP002356355.
Grama, H. et al: "IBM Workplace Client Technology (Rich Client Edition) Technical Overview" IBM Redbooks Paper, 'Online! Aug. 16, 2004, XP002356359.

* cited by examiner

*Primary Examiner* — Namitha Pillai
(74) *Attorney, Agent, or Firm* — Garg Law Firm, PLLC; Rakesh Garg; Parashos Kalaitzis

(57) ABSTRACT

The present invention is a user interface for varying accessibility parameters to match comprehension needs. The present invention consists of a uniform, easy to use, interface to applications. Rather than dealing directly with the user interface parameters of a particular application, the user interacts with this uniform interface, or UI aggregator. The UI aggregator can then transform the information presented by the particular application or combination of applications as desired by the user. The UI aggregator can be accessed through a variety of modes—keyboard, speech, touch, and gestures. Through interaction with the UI aggregator, the user can create and select user profiles that control multiple software applications.

2 Claims, 4 Drawing Sheets

UNIFORM USER INTERFACE FOR SOFTWARE APPLICATIONS

TECHNICAL FIELD

The present invention relates generally to user interfaces and, more particularly, to a uniform user interface for multiple software applications.

BACKGROUND

Users interface with a multitude of software applications in a multitude of computing devices in a multitude of settings. On a standard desktop computer or laptop, a user may use a word processor, web browser, e-mail program, spreadsheet, or other applications. With a cell phone or other pervasive computing device, he may use e-mail or an address book. The user may interact with the computing device in a car, on an airplane, in an office by himself or with other people, or even on the beach. A user can be in a noisy or quiet environment, one with adequate light or dim light, one offering privacy and one in a public place.

Applications differ in their adaptability to the presentation of information. Some applications, like a word processor or web browser, can change the format of text—the fonts and the layout of paragraphs. Applications can have a wide variety of control settings. Several of these applications may be combined to achieve the desired presentation of information.

The characteristics and situations of users vary. A user can be in a rush, needing a summary of important information, or with time for an intensive examination of materials. Users differ in cognitive abilities. Some may have severe cognitive disabilities. With each application on each device, in each setting, and with each set of user characteristics, a different interface might be desirable.

Currently, setting the user interface in a single application requires considerable knowledge and effort. The user must deal with the configuration tool of the application, and understand the parameters involved, and how they are controlled. For instance, to change the font display in a word processor, it may be necessary to highlight the text; go to the font selection menu; select a font type, size and style; confirm the choice; and check the display. If the display is not what was desired, the user must try again. Setting the interfaces for a series applications is a daunting task. Setting the proper user interfaces for applications that work in combination is even more complex.

Because of the difficulty involved, the selection of a user interface tends to be static. A setting, once selected, tends to remain in force. Nevertheless, because of changing environments and changing user situations, it may be desirable to make frequent changes to the user interfaces.

Therefore, there is a need for an interface to software applications that is uniform across computing devices and software applications, and is simple and easy to use. It would allow the user to easily change settings to suit different environments or different circumstances, and would eliminate the need to learn settings for each application.

SUMMARY OF THE INVENTION

The present invention consists of a uniform, easy to use, interface to software applications. Rather than dealing directly with the user interface parameters of a particular application, the user interfaces with this uniform interface, or UI aggregator. The UI aggregator can then transform the information presented by the particular application or combination of applications as desired by the user.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
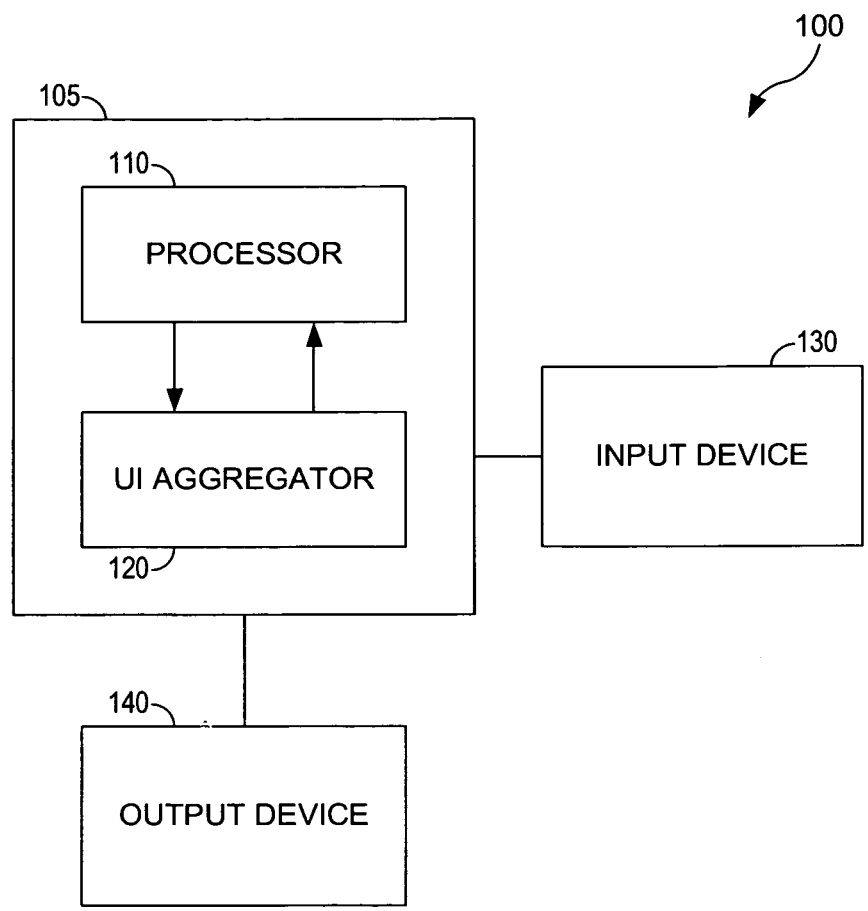
FIG. 1 shows a block diagram of a computer system.

FIG. 1 shows a block diagram of a computer system 100. The computer system 100 is comprised of a computer 105 with a processor 110, one or more input devices 130 and one or more output devices 140. The input devices can include a keyboard, a mouse, a touch pad, a roll ball, a speech recognition system, a touch-sensitive device, a gesture recognition system, or a device providing remote access to the computer 105 such as a cell phone or other pervasive computing device. The output devices can include one or more of a video monitor, a printer, a speech generator, and a sound generator. Installed on the computer 105 is a user interface aggregator (UI aggregator) 120. This is a uniform, easy-to-use interface to software applications.

Figure 2A:
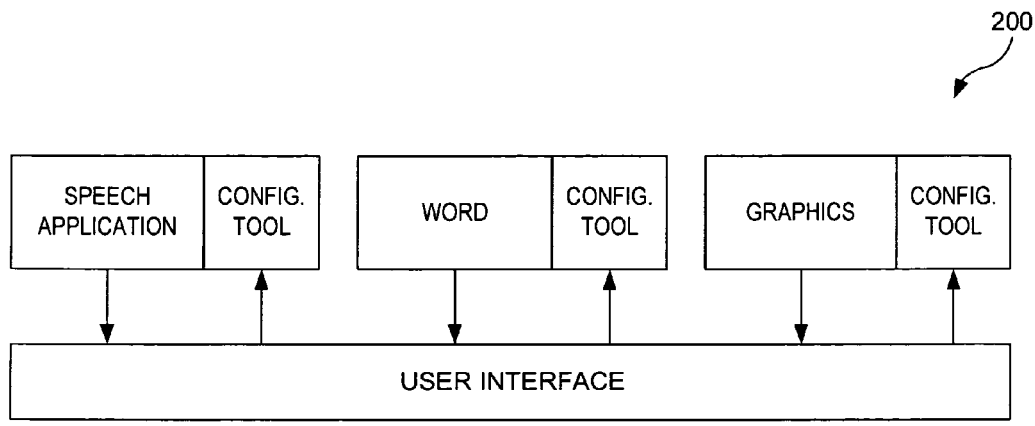
FIG. 2A shows a current user interface.

FIG. 2A shows a current user interface 200. To modify the presentation of information by a series of applications, the user must interact separately with the configuration files of each application. Thus, the user must understand the parameters involved for configuring each particular application, and how they are controlled.

Figure 2B:
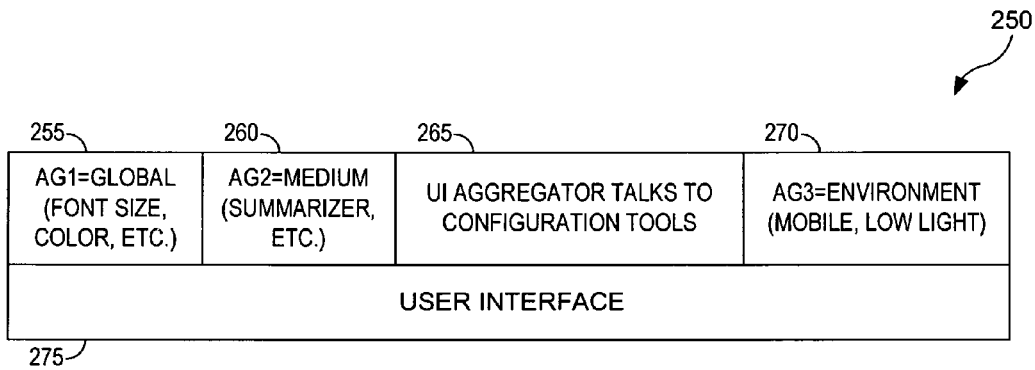
FIG. 2B illustrates the UI aggregator.

FIG. 2B illustrates the UI aggregator. The UI aggregator 250 provides a uniform, easy to use, interface to software applications. The UI aggregator 250 is comprised of a user interface 275, an interface to applications 265, and three components, AG1 (global) 255; AG2 (medium) 260; and AG3 (environmental) 270. The user issues user interface commands and user profile instructions to the user interface 275, and the interface to applications 265 communicates with the configuration tools of applications to adjust the presentation of information by the applications.

The user interacts with the user interface 275 through a series of user interface commands and user profile instructions to change the presentation of information of applications, rather than dealing directly with the user interface parameters of a particular application. Thus, the user needs to learn one interface, the user interface 275, rather than a series of different user interfaces. Further, the user interface 275 of the UI aggregator 250 is designed to be easy to use. In an embodiment with voice interface, the user can change the font size by simply saying, "increase font size," or, more simply, "larger." To change the type of font, the user can say "change font." The user interface 275 of the UI aggregator 250 can ask the user for a particular font, or display a list of fonts for the selection of the user. In an embodiment, the user interface 275 can be accessed through a variety of modes—keyboard, speech, touch, and gestures. The speech interface includes command and control speech recognition. Touch includes an uncomplicated touch array.

Through the interface to applications 265, the UI aggregator 250 transforms the information presented by a particular application or combination of applications as desired by the user. In an embodiment of the invention, the UI aggregator 250 adjusts the user interface parameters of the particular applications. In another embodiment of the invention, the UI aggregator 250 transforms the content of the applications into its own format, and modifies its own display settings as desired. In another embodiment of the invention, the UI aggregator 250 uses a combination of the two above methods.

Interaction with the UI aggregator 250 can enable a user to enhance his comprehension by adjusting parameter settings for individual modes of presentation as well as for combinations of modes. A major enhancement mode is for the reading of text. Other enhancements can include modifications of the pitch, rate, and spacing between words in spoken information. Important words can be spoken more slowly and with greater emphasis whereas less salient words can be spoken at a normal level. When speech and text are presented concurrently, synchrony between the speech and text can be adjusted for maximum comprehension.

Three components of UI aggregator 250 are AG1 (global) 255; AG2 (medium) 260; and AG3 (environmental) 270. The AG1 global component 255 applies across all applications and computing devices, handling aspect of interface such as font size, font type, and color. Text format commands could include "larger", "smaller", "banner text", "high contrast", and "normal contrast." Speech format commands could include "louder", "softer", "faster", "slower", "wait", and "resume" or "continue". The AG2 260 medium component controls the styling of information. Styling commands could include "key words", "summarize", "elaborate", and "condense". These commands permit the user to select a terser or more discursive presentation of information.

The AG3 environmental component 270 controls the modification of interfaces according to different computing environments. For example, a user can select different means for interface in a car, in a low light environment, in a private office, and in a public setting. By interacting with the user interface 275 of the UI aggregator 250, the user can select, modify, and create user profiles containing desired settings for different computing environments. For example, the user may create one profile for the use of a laptop in an office, and another for use in a car. In a car, the main display mode can be speech, with a variety of controls. In an office, the user can select text display. These profiles can each control the settings of multiple software applications. Commands can also switch between modes of presentation; for example, "speech" or "text", or between languages.

The AG3 environmental component 270 provides the user with default profiles. The user can modify those settings to create his own profiles, or create his own from scratch. The user selects a profile with the desired settings for each particular situation. In this way, it is easy to change user interface settings as circumstances change. Further, in an embodiment of the invention, the AG3 environmental component 270 can learn which settings apply in which circumstances, saving the user the trouble of switching.

Figure 3:
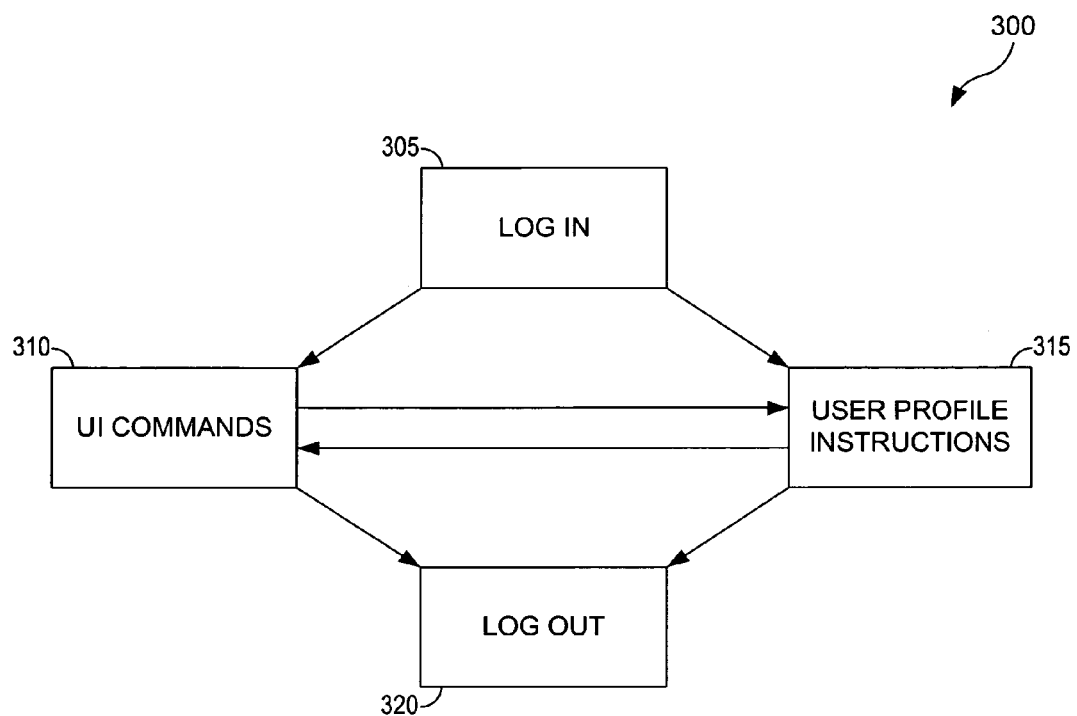
FIG. 3 depicts a flow chart showing the inputs a user provides to the UI aggregator.

FIG. 3 depicts a flow chart showing the method 300 by which a user provides inputs to the UI aggregator 250. In step 305, the user logs in to begin the process. Then, the user issues a series of user interface commands and user profile instructions. The user can issue either user interface commands or user profiles at any time between login at step 305 and logout at step 320.

In step 310, the user issues user interface commands. The user interface commands control the display and the information styling of the information being presented. In step 315, the user issues user profile instructions. These instructions allow the user to select a user profile, modify a user profile, or create a new user profile. In step 320, the user logs out.

Figure 4:
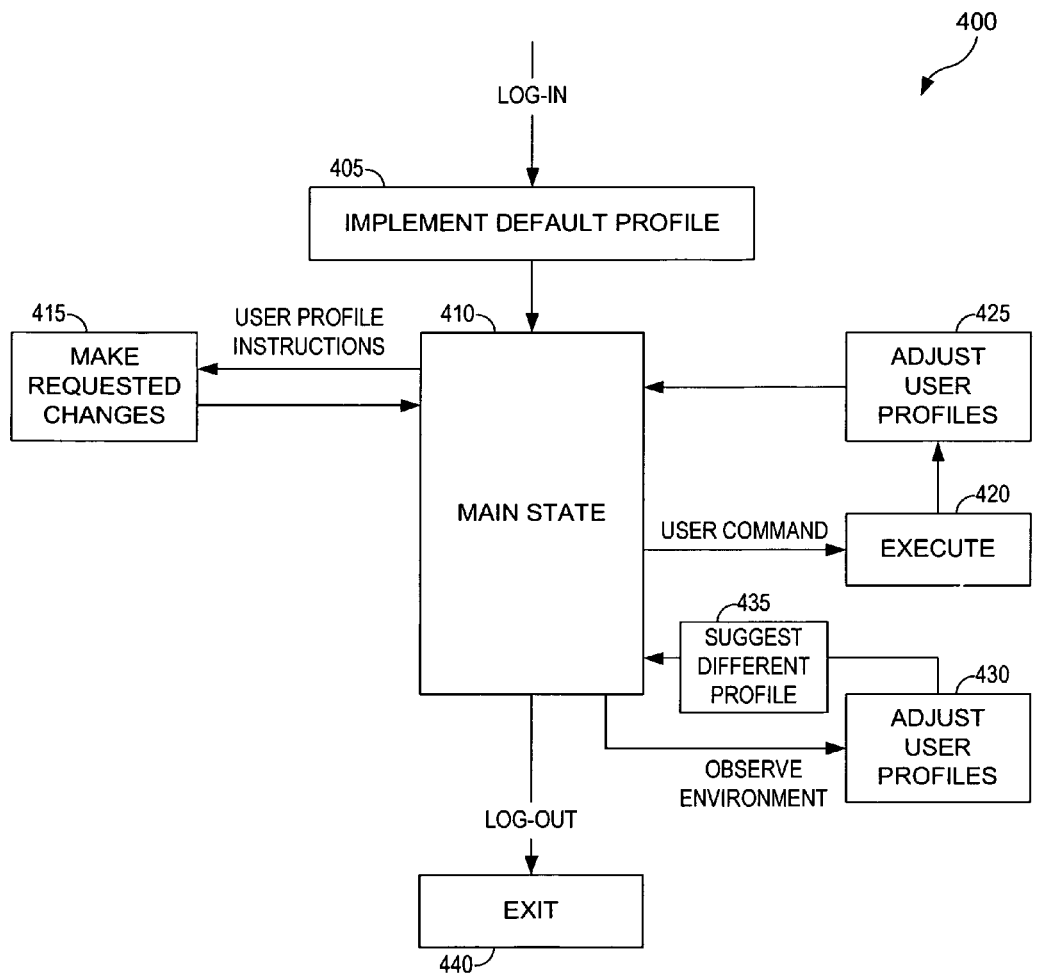
FIG. 4 depicts a flow chart of the operation of the UI aggregator.

FIG. 4 depicts a flow chart of the method 400 by which the UI aggregator 250 operates. At login, in step 405 the UI aggregator 250 selects the current default user profile. It can be a default provided by the UI aggregator 250 or a user profile selected by the user. In step 410, the UI aggregator 250 then proceeds to the main state, where the UI aggregator 250 executes a series of interface commands and user profile instructions from the user. In step 415, in response to a user profile instruction, the UI aggregator 250 makes requested changes in a user profile. In step 420, the UI aggregator 250 executes a user command. It then optionally goes to step 425, adjusting a user profile, before returning to the main state. In step 440, after the user logs out, the UI aggregator 250 exits.

In an embodiment with a learning module, the UI aggregator 250 also studies the interaction between the user and the computing environment. In step 430, it can then create or modify profiles for the user. Once it has learned which profile a user prefers in a particular environment, in step 435 it can recommend that profile when the user enters into the environment. The UI aggregator 250 can even switch to that user profile automatically.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method to control a user interface for performing input and output of information with multiple software applications, comprising the steps of:

interacting with a UI aggregator to specify the user interface for the multiple software applications, the UI aggregator including (i) a first component that applies uniform aspects of the user interface across all applications and computing devices, (ii) a second component that controls a styling of information presented on the user interface, and (iii) a third component that modifies the user interface according to conditions in a computing environment, wherein the second component accepts at least one styling command, the at least one styling command allowing a selection of terse or discursive presentation of the information on the user interface, the at least one styling command allowing presentation of (i) key words, (ii) summarized information, (iii) elaborate information, and (iv) condensed information, based on the information;

interacting between the UI aggregator and the multiple software applications to implement the user interface;

uniformly controlling across the multiple software applications a presentation of the output using the UI aggregator such that the UI aggregator performs a combination of (i) adjusting a parameter of a user interface of an application in the multiple software applications, and (ii) transforming a content of an application in the multiple software applications to a format of the user interface;

creating in the UI aggregator user modifiable profiles configured to uniformly control the presentation of the output using the user interface based on user profile instructions received at the UI aggregator; and wherein accessibility parameters are varied for a combination of modes to match at least one comprehension need, wherein a mode modifies one of (i) pitch, (ii) rate, and (iii) spacing between words in spoken information, wherein another mode enhances reading of a text, wherein in a combination of modes some words are spoken slower and with more emphasis as compared to other words, and wherein in a combination of modes where when speech and text are presented concurrently a synchrony between the text and the speech is adjusted for increased comprehension.

2. A computer usable program product comprising a non-transitory computer usable storage medium including computer usable code to control a user interface for performing input and output of information with multiple software applications, the computer usable code comprising:

computer usable code for interacting with a UI aggregator to specify the user interface for the multiple software applications, the UI aggregator including (i) a first component that applies uniform aspects of the user interface across all applications and computing devices, (ii) a second component that controls a styling of information presented on the user interface, and (iii) a third component that modifies the user interface according to conditions in a computing environment, wherein the second component accepts at least one styling command, the at least one styling command allowing a selection of terse or discursive presentation of the information on the user interface, the at least one styling command allowing presentation of (i) key words, (ii) summarized information, (iii) elaborate information, and (iv) condensed information, based on the information;

computer usable code for interacting between the UI aggregator and the multiple software applications to implement the user interface;

computer usable code for uniformly controlling across the multiple software applications a presentation of the output using the UI aggregator such that the UI aggregator performs a combination of (i) adjusting a parameter of a user interface of an application in the multiple software applications, and (ii) transforming a content of an application in the multiple software applications to a format of the user interface;

computer usable code for creating in the UI aggregator user modifiable profiles configured to uniformly control the presentation of the output using the user interface based on user profile instructions received at the UI aggregator; and wherein accessibility parameters are varied for a combination of modes to match at least one comprehension need, wherein a mode modifies one of (i) pitch, (ii) rate, and (iii) spacing between words in spoken information, wherein another mode enhances reading of a text, wherein in a combination of modes some words are spoken slower and with more emphasis as compared to other words, and wherein in a combination of modes where when speech and text are presented concurrently a synchrony between the text and the speech is adjusted for increased comprehension.

* * * * *